Jan. 1, 1963 W. E. MARTIN 3,071,051
PATCH ROLLER APPARATUS
Filed April 11, 1960 9 Sheets-Sheet 1
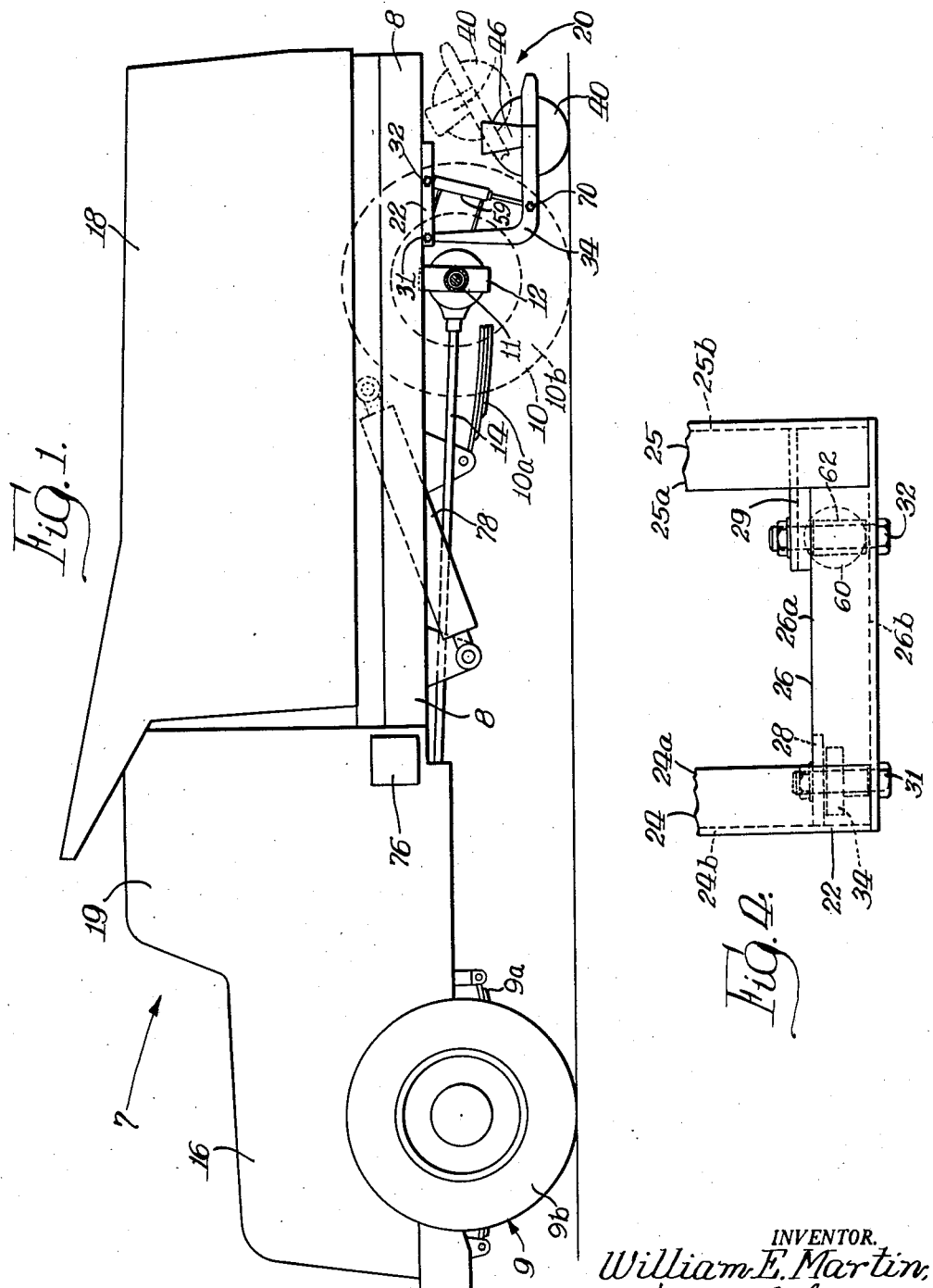
INVENTOR.
William E. Martin,
BY Brown, Jackson,
Boettcher & Dienner
Atty's.

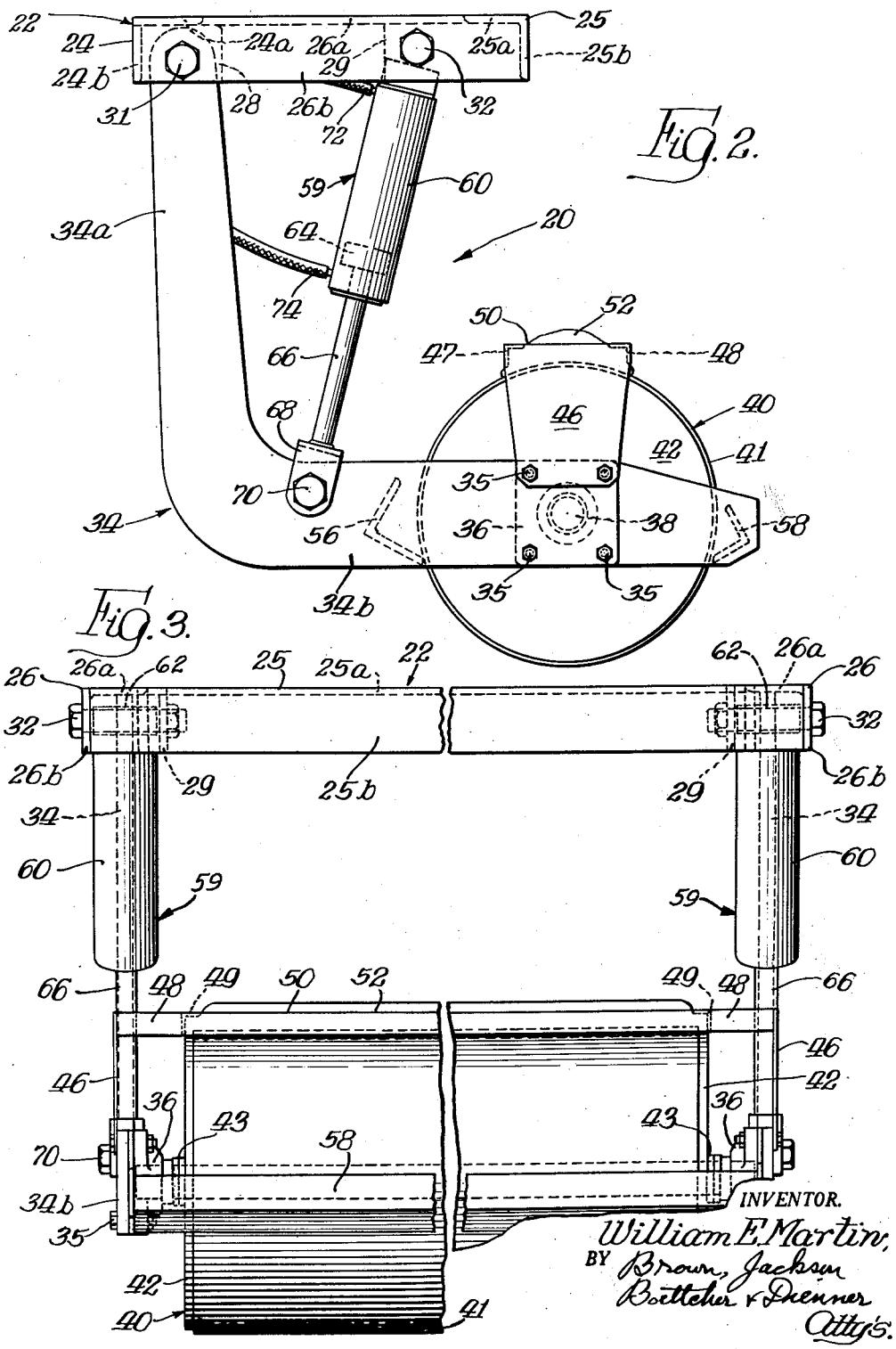

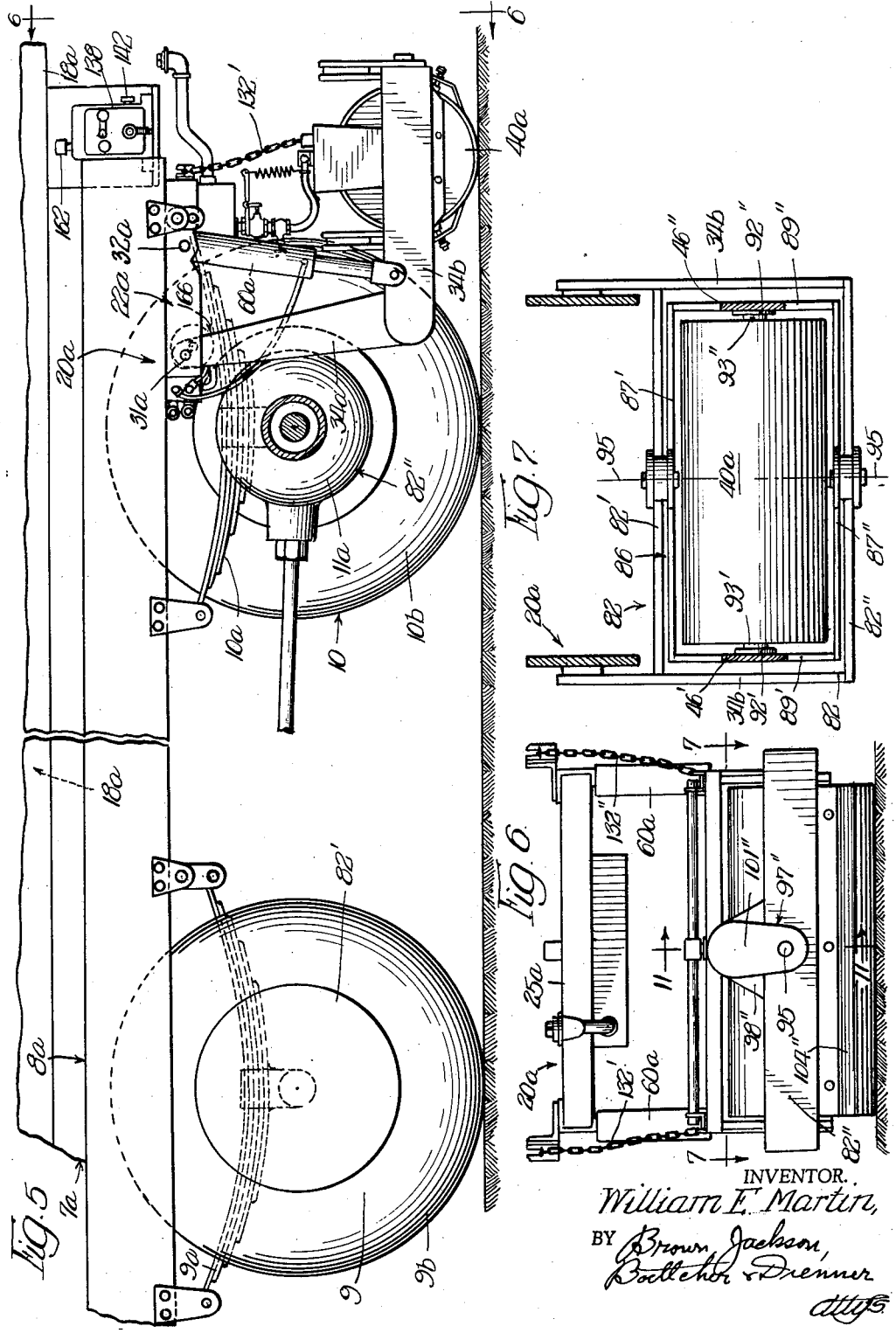

Jan. 1, 1963     W. E. MARTIN     3,071,051
PATCH ROLLER APPARATUS
Filed April 11, 1960     9 Sheets-Sheet 4
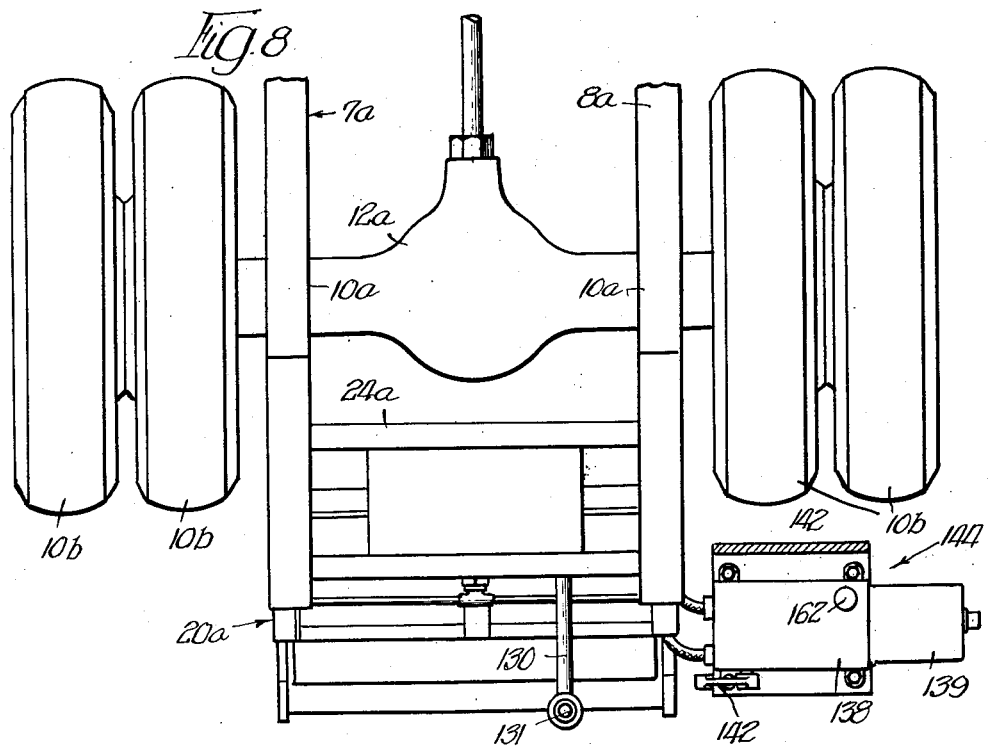
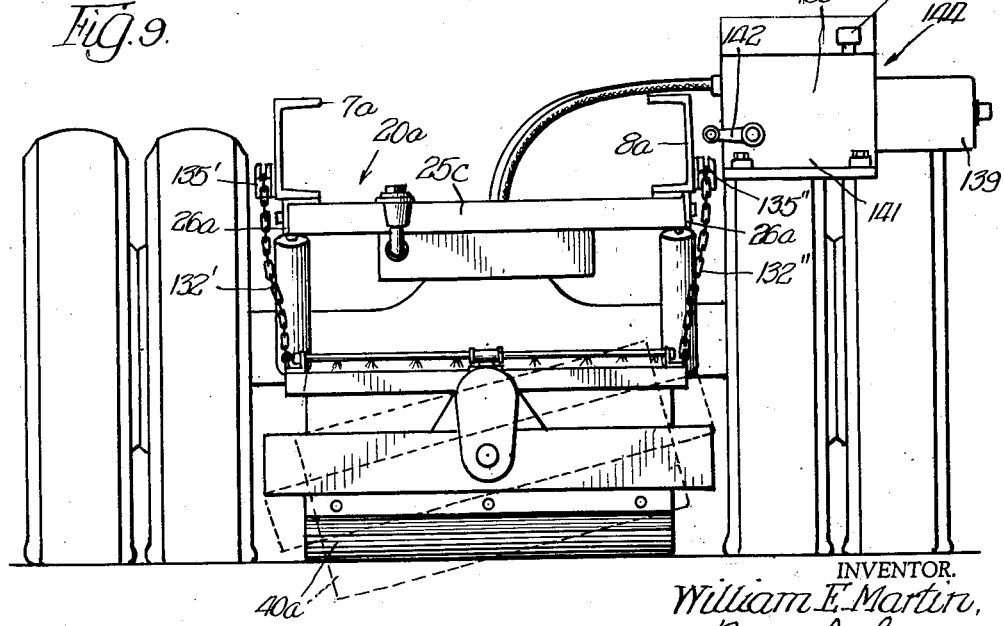
INVENTOR.
William E. Martin,
BY Brown, Jackson
Boettcher & Dienner
Attys.

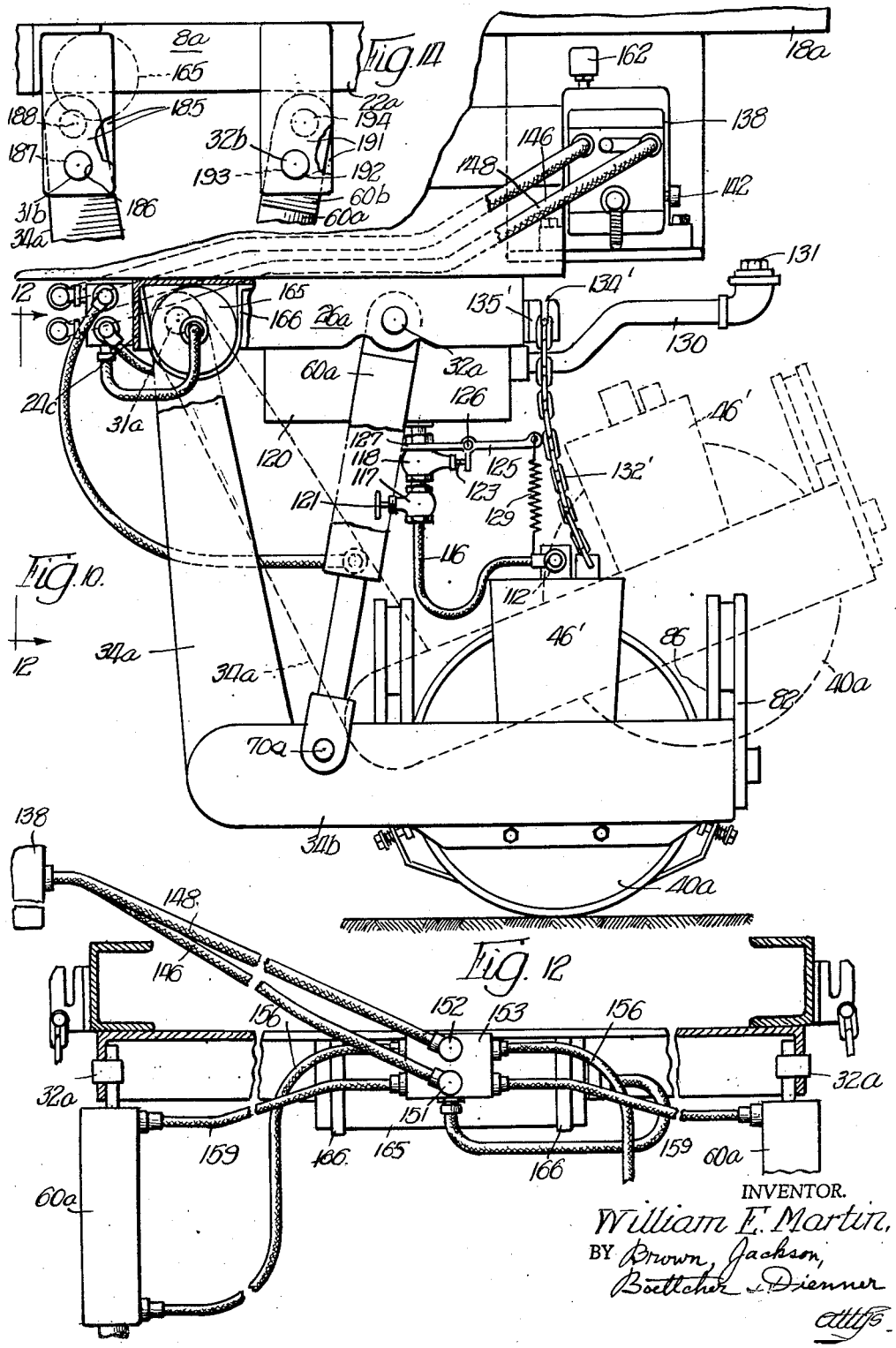

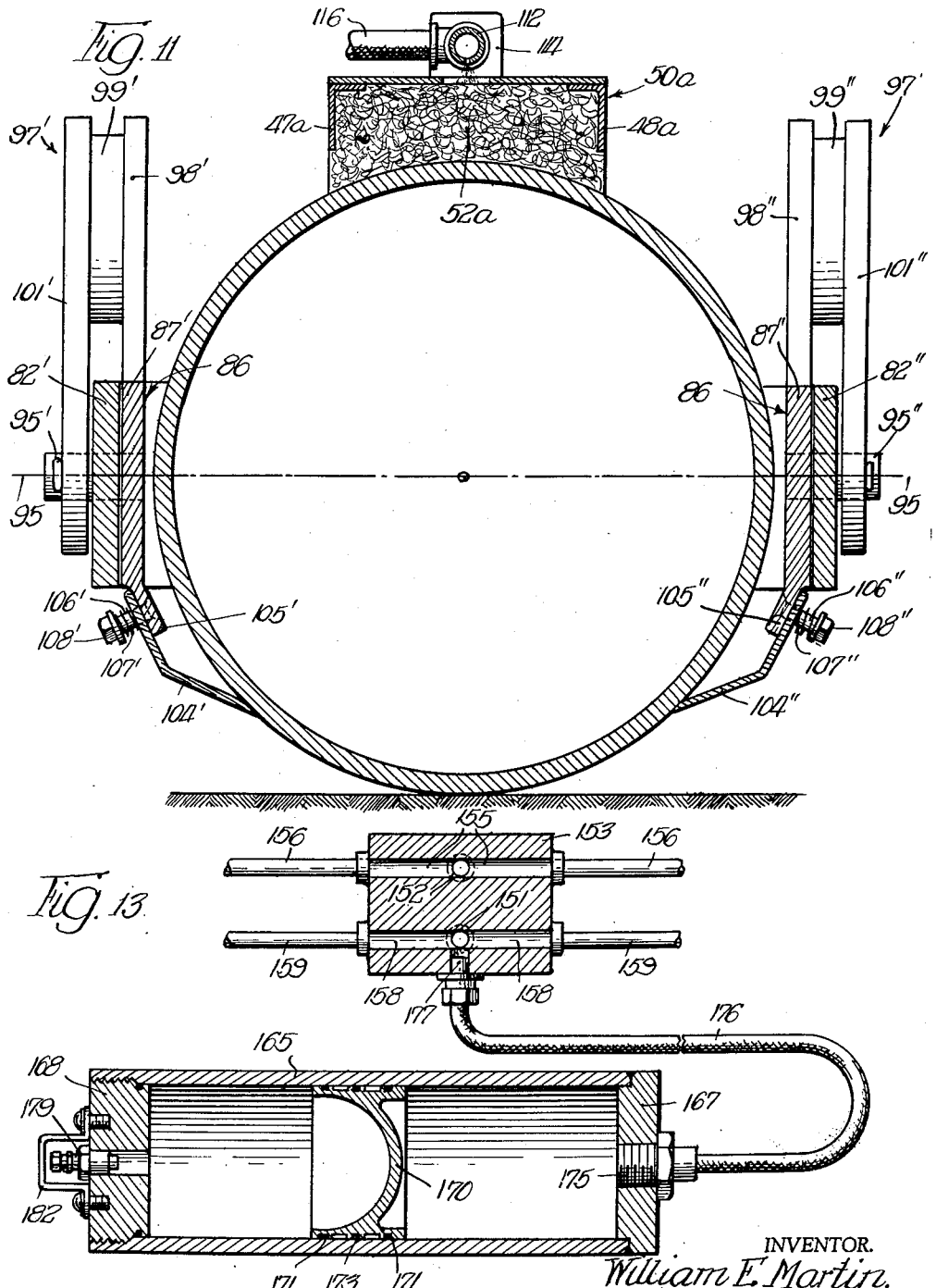

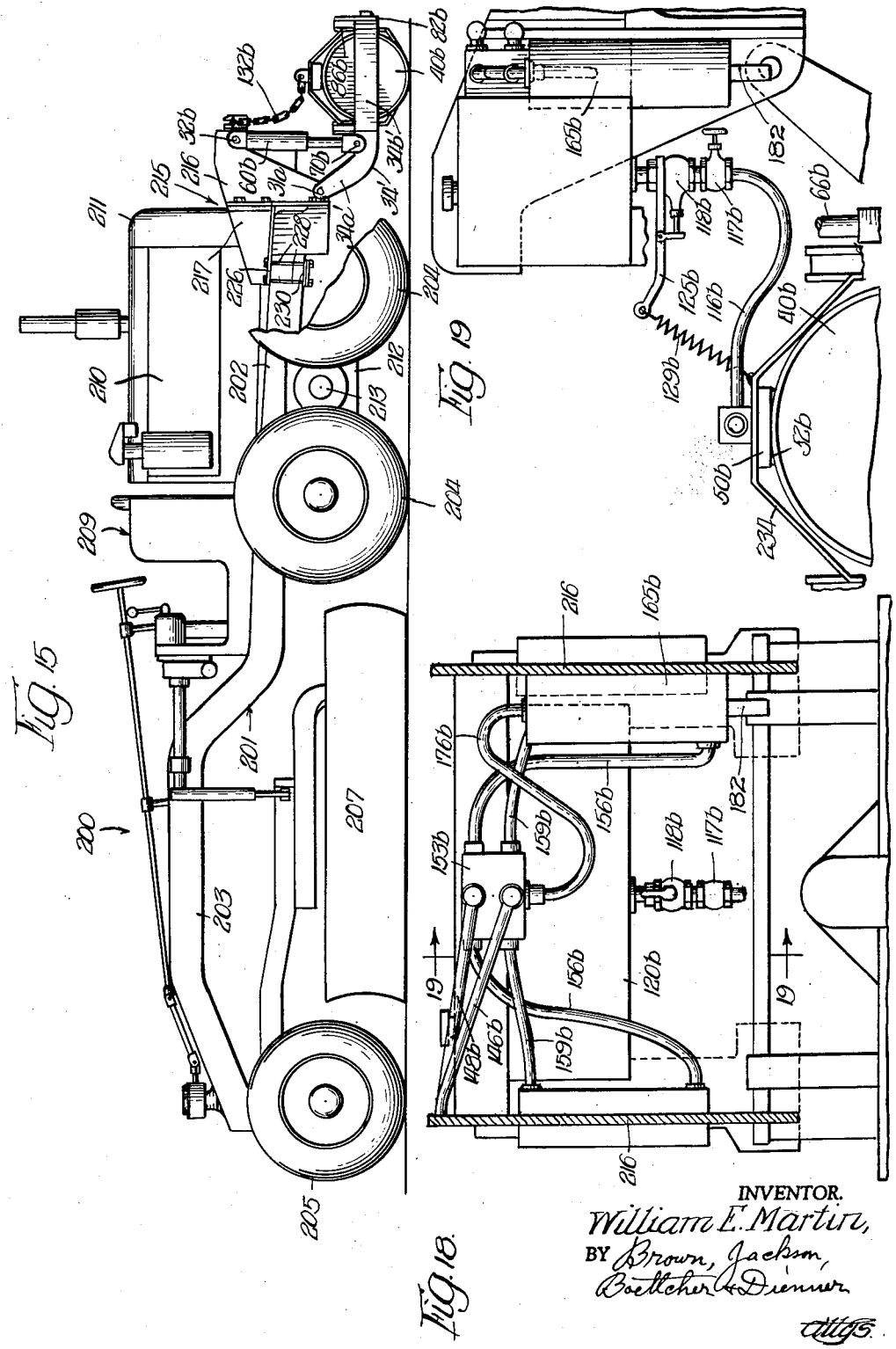

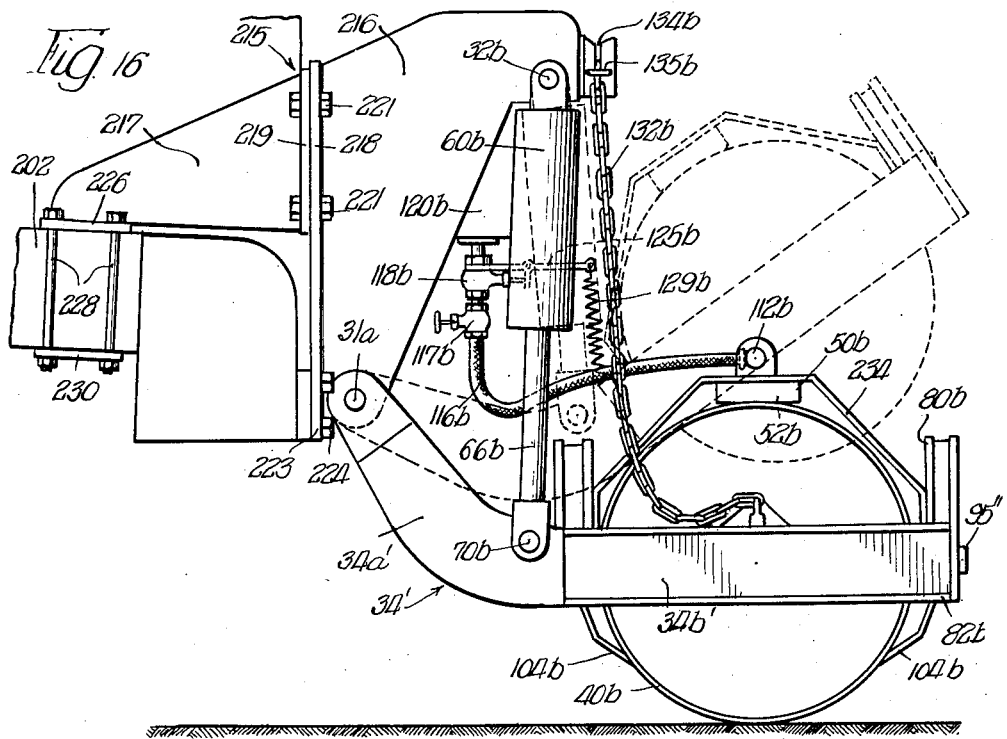
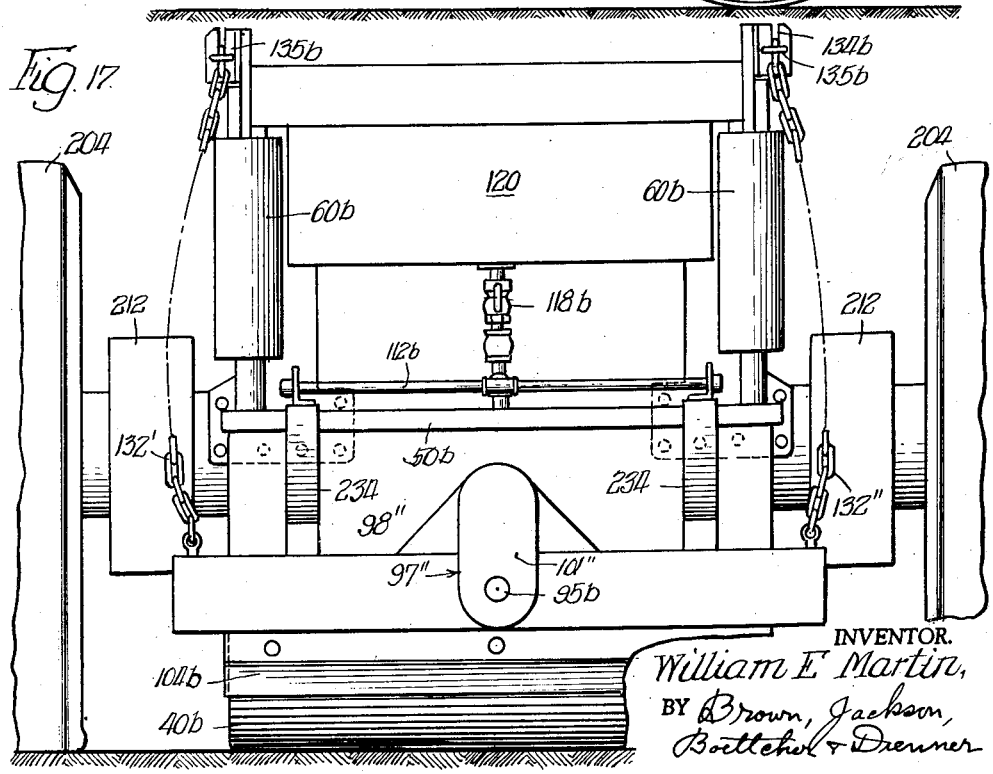

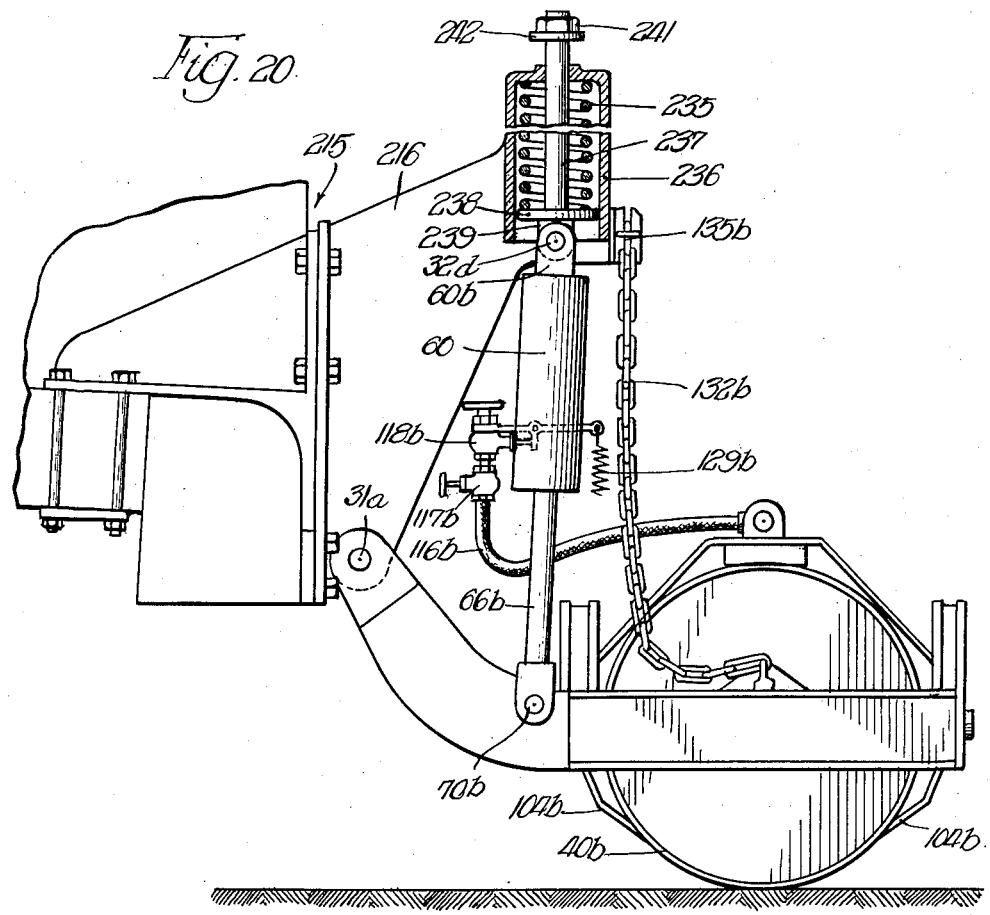

United States Patent Office 3,071,051
Patented Jan. 1, 1963

3,071,051
PATCH ROLLER APPARATUS
William E. Martin, Kewanee, Ill.
Filed Apr. 11, 1960, Ser. No. 21,486
11 Claims. (Cl. 94—50)

The present invention relates to an improved patch roller apparatus adapted primarily for mounting as an attachment on the rear end of a dump truck or other self-propelled road vehicle. The present application is a continuation-in-part of my earlier application on "Patch Roller Attachment," Serial No. 539,333, filed October 10, 1955, now abandoned.

Much of the road repair or patch work now done on public highways consists of dumping so-called "black top" or similar patching compound from a dump truck, and then rolling or hand tamping this patching compound to level it out over the area to be patched. The operation of leveling the newly dumped batch of black top frequently presents a problem in these patching operations. For example, in many instance these patching operations may be small in area, and may be located a substantial distance apart, so that it is not practical or economically feasible to have a full size road rolling machine available for rolling out and leveling each patching area. Furthermore, owing to the slow rate of travel of these road rolling machines, considerable time is involved in getting them from one site to another, or they must be separately trucked. When patching with a hot mix, time is of the essence and it is important to have a roller ready for immediate use as soon as the mix is spread over the patching area.

Hand tamping, on the other hand, requires a prodigious amount of labor, and involves a substantial expense owing to the high cost of labor.

To provide for these situations, I have devised an improved patch roller attachment for mounting on the rear end of a dump truck, which dump truck is usually the one that carries the load of black top mix to the point of road repair The patching roller of this attachment is forced down into rolling engagement with the dumped patching material by hydraulically operated lifting and lowering mechanism which derives its operating energy from the same hydraulic system that operates the dumping body of the truck. This hydraulically operated lifting and lowering mechanism can exert sufficient reaction pressure through the patching roller to lift the weight of the truck. Hence, any desired part of the weight of the truck can be brought to bear on the patching roller in the performance of its rolling operation, while still leaving the truck with adequate traction through its rear wheels to perform the rolling operation. Another advantage of my improved construction is the self-contained assembly of the entire attachment on a mounting frame which can be easily mounted on the rear end of the truck.

I also contemplate as a further embodiment of the invention the provision of a modified patch rolling apparatus for mounting on the rear end of a motor driven road grader or scraper of the type generally used for road grading or scraping operations. These grading or scraping operations are performed through an adjustable scraper blade which is suspended from the grader frame between the front steering wheels and the rear traction wheels, all of which are customarily provided with pneumatic rubber tires. This motor grader embodiment of patch roller attachment is characterized by substantially all of the feaures and advantages of the dump truck form of patch roller attachment, such as the ability to bring any desired proportion of the weight of the rear end of the motor grader to bear downwardly upon the patch roller, as previously described.

My invention further contemplates as a further unique feature, the provision of a transversely rockable mounting for the patching roller, which rockable mounting is applicable to both the dump truck embodiment and to the motor grader embodiment. During the patch rolling operation, this mounting permits the patching roller to rock transversely about a substantially horizontal axis extending fore and aft or longitudinally of the propelling vehicle, such rockable mounting being preferably obtained by mounting the roller for rolling rotation within a rocker frame which is mounted on rocker pivots within a lifting and lowering frame, whereby the rocker frame and roller can tilt or incline transversely relatively to the lifting and lowering frame. Hydraulic rams are operatively connected with the lifting and lowering frame, for lifting both frames and the roller to an elevated transport position, or for lowering both frames to bring the roller down to pressure engagement with the road surface to be rolled. Such transversely rockable mounting has the advantages of enabling the patching roller to automatically accommodate itself to the sloping side of a crowned road, or to a side-long slope along the curb. It also enables the operator to carry the patching roller out to the very edge of the road shoulder, with the adjacent side wheels of the dump truck or of the motor grader traveling down in the ditch beyond the road shoulder.

Another feature of the invention is the provision of front and rear spring pressed scraper blades bearing against the front and rear surfaces of the patching roller for scraping any excess accumulation of black top or other patching compound tending to adhere to the roller, these spring pressed scraper blades both being mounted on the aforesaid rocker frame so that they rock directly with the roller and thus maintain scraping contact with the surface of the roller at all angles of transverse rocking.

Another feature resides in the provision of unique lubricating apparatus, preferably in the form of a trough containing a lubricating mat or pad which bears against the top surface of the roller for spreading a film of lubricant over the roller, this trough and its lubricating mat being carried by the aforesaid rocker frame so as to maintain lubricating contact with the surface of the roller in the different rocking angles of the roller.

Another feature of the invention resides in the provision of an automatic shut-off valve for controlling the flow of lubricant from the supply tank to the lubricating trough and mat, such valve being automatically opened to start the flow when the roller is lowered into operative position in engagement with the road surface, and such valve being automatically closed to stop such flow when the roller is lifted into transport position.

Another feature of the invention resides in the provision of a unique hydraulic pressure supply system which may constitute part of the complete patch roller installation, the need for such hydraulic pressure supply system arising when the propelling vehicle does not have any conventional hydraulic system built in as a part of its standard equipment, or when such built-in hydraulic equipment is not operative to generate the pressures required for forcing the patch roller down against the road surface under satisfactory pressures.

Another feature of the invention resides in the provision of improved cushioning means for cushioning the relatively large downward pressures which the hydraulic rams can bring to bear on the patching roller for forcing the roller into contact with newly laid paving materials under relatively high pressures. The hydraulic liquid, is, of course, incompressible and unyielding, and, accordingly, shock stresses may arise if the patching roller should suddenly strike a substantial obstruction or pass over a quick rise or fall in the road surface, at which times the incompressible hydraulic liquid affords no yielding or cushioning action, with the resulting possibility of damage to the patch rolling apparatus, or damage or substantial irregularities in the surface of the road patching material. In one embodiment of this improved cushioning means I utilize a pneumatic cushioning action, which is preferably superposed upon the hydraulic liquid pressures, whereby the hydraulic liquid pressures react against a confined body of air or gas which asumes the pressures built up in the hydraulic liquid; but such body of air or other gas having the necessary elastic or yieldable compressibility which will quickly yield and avoid shock or other deleterious action in the event of the patching roller striking the aforesaid obstruction or encountering a quick rise in the road surface, etc. This pneumatic cushioning action is preferably obtained by the use of a so-called hydraulic accumulator, which comprises a cylinder having a freely reciprocable piston therein, against one side of which piston acts the hydraulic pressures which are forcing the patching roller down into pressure engagement with the road surface, and against the other side of which piston acts the pneumatic pressures of a pre-charged volume of gas which has been previously inserted into the other end of the cylinder. The resulting pneumatic cushioning action still enables the same hydraulic pressures to be set up in the hydraulic rams for enabling any desired proportion of the weight of the rear end of the vehicle to be brought to bear upon the patching roller, but without the likelihood of shock loads occurring.

In another embodiment of the improved cushioning means, I may associate powerful compression springs with the hydraulic rams so that the inherent resiliency of the compression springs give a pronounced cushioning action to the hydraulic pressures. In the preferred form of this latter embodiment, these compression springs are interposed between the upper ends of the hydraulic rams and the points of attachment of the rams to the propelling vehicle, so that the upward reaction of each ram tending to lift the weigh of the rear end of the propelling vehicle is borne by the cushioning action of the compression springs, thereby reducing or minimizing the shock loads which may occur upon the roller encountering an abrupt obstruction, etc.

Another feature of the invention resides in an improved vertically adjustable type of pivot mounting which pivotally supports the upper ends of the lifting and lowering levers that swingably support the patching roller for movement between transport position and road rolling position. The vertical adjustability of this pivot relatively to the attachment frame enables a standard size of attachment unit to be readily adjusted either for use on dump trucks or other propelling vehicles of relatively low height, or to be readily adjusted for use on dump trucks or other propelling vehicles of relatively high height. If desired, this vertically adjustable pivot mounting may also be incorporated between the upper ends of the hydraulic rams and the attachment frame for accommodating high and low vehicles, although the need for such adjustability is not so great in the case of the hydraulic rams because of their endwise extensibility.

Other features, objects and advantages of the invention will be apparent from the following detail description of certain preferred embodiments of the invention. In the accompanying drawings illustrating such embodiments:

FIGURE 1 is a side view showing my improved attachment mounted on the rear end of a dump truck;

FIGURE 2 is an elevational view of the attachment on a larger scale, as viewed from one end of the attachment roller;

FIGURE 3 is a fragmentary rear elevational view of the attachment, as viewed from the roller surface of the attachment roller;

FIGURE 4 is a fragmentary plan view of one end of the attachment frame;

FIGURE 5 is a fragmentary side view, partly broken away, showing a modified form of my invention applied to a dump truck of the same general type illustrated in FIGURE 1;

FIGURE 6 is a rear end view of the patch roller attachment assembly of this modified embodiment of FIGURE 5, taken approximately on the plane of the line 6—6 of FIGURE 5;

FIGURE 7 is a horizontal sectional view taken approximately on the plane of the line 7—7 of FIGURE 6, showing in plan the lifting and lowering frame, the rocker frame which is rockably mounted therein, and the patching roller which is journaled for rotation within the rocker frame;

FIGURE 8 is a fragmentary plan view of the rear end of the dump truck frame showing the patch roller installation equipped with an electrically driven hydraulic pump which is separate and apart from any hydraulic system on the dump truck;

FIGURE 9 is a rear end view of the lower portion of the dump truck with the patch roller apparatus mounted thereon, this figure illustrating in dotted lines the patching roller tilted into one of its transversely rockable angular positions;

FIGURE 10 is a side view of the patch roller attachment on a larger scale to illustrate the hydraulic connections with the independent electrically driven pump and to show the automatic control of the lubricating liquid to the top surface of the patching roller;

FIGURE 11 is a transverse sectional view through the patching roller and the lifting and lowering frame and the rocker frame on a substantially larger scale, this view corresponding to a section taken approximately on the plane of the line 11—11 of FIGURE 6;

FIGURE 12 is a fragmentary view of that embodiment of the hydraulic system which utilizes the electrically driven hydraulic pump, and which also utilizes a hydraulic accumulator for cushioning the downward pressures exerted against the patching roller;

FIGURE 13 is a fragmentary development of FIGURE 12, showing in section the distributor block and the hydraulic accumulator of the hydraulic system;

FIGURE 14 is a fragmentary detail view showing the vertically adjustable pivot mountings for adjustably supporting the upper ends of the lifting and lowering levers that carry the patching roller, and for adjustably supporting the upper ends of the hydraulic rams;

FIGURE 15 is a side elevational view, partly broken away, illustrating the road grader embodiment of my patch roller apparatus mounted on the rear end of a conventional motor driven road grader;

FIGURE 16 is a side elevational view of this motor grader embodiment of patch roller attachment, shown on a larger scale;

FIGURE 17 is a rear end view of this motor grader embodiment;

FIGURE 18 is a view somewhat similar to FIGURE 12, illustrating the hydraulic connections with the distributor block and with the hydraulic accumulator in such latter embodiment;

FIGURE 19 is a fragmentary view at right angles to FIGURE 18, taken approximately on the plane of the line 19—19 of FIGURE 18; and FIGURE 20 is an end elevational view, partly in section, showing a further modification of the patch roller attachment wherein the cushioning action is obtained by the interposition of heavy compression springs between the upper ends of the hydraulic rams and the vehicle frame.

The dump truck 7 illustrated in FIGURE 1 is of any conventional construction comprising a main frame 8 which is spring supported on front and rear wheels 9 and 10 through interposed front and rear leaf springs 9a and 10a, these front and rear wheels having conventional pneumatic tires 9b and 10b respectively. The rear wheels 10 are driven from a conventional rear axle 11 enclosed within a rear axle housing 12 and receiving power through a propeller shaft 14 from a power plant located under the hood 16 of the truck. A hydraulically operated dump body 18 is arranged to dump rearwardly over the rear end of the frame 8 through an engine driven hydraulic system controllable either from the cab 19 or from the rear end of the truck.

The patching roller attachment is designated 20 in its entirety, and is disposed and supported as a unit on the under side of the rear end of the truck frame 8, in rear of the rear axle housing 12. The attachment is self-contained on a rectangular frame 22 extending transversely of the truck frame 8. This rectangular frame 22 comprises front and rear transversely extending angle bars 24 and 25, having horizontally extending upper flanges 24a and 25a, and having vertically extending side flanges 24b and 25b respectively. These transversely extending angle bars 24, 25 are joined at their ends by end angle bars 26 having horizontally extending upper flanges 26a and vertically extending side flanges 26b, the latter flanges being welded to the upper flanges and side flanges of the front and rear angle bars 24 and 25 respectively. Referring particularly to FIGURE 4, at each end of the frame a front bracket plate 28 is welded to the flanges 24a, 24b and 26a, and this bracket plate supports the inner end of a pivot bolt 31 which has its outer end supported in the vertical flange 26b of end bar 26. Also, a rear angle bracket 29 is welded to the flanges 25a, 25b and 26a, and supports the inner end of a pivot bolt 32 which has its outer end supported in vertical flange 26b of end bar 26. The above-described frame 22 is bolted or otherwise secured to the under side of the main frame 8 of the truck, such as by bolts passing up through the angle bar flanges 24a and 25a and being secured to and passing up through the lower flanges of truck frame 8.

Pivotally mounted on the front pivot bolts 31 are the upwardly extending arms 34a of L-shaped levers 34. Secured to the horizontally extending arms 34b of these L-shaped levers 34 by bolts 35 are bearings 36 in which the ends of the transverse shaft 38 are rotatably journaled. Mounted on this rotatable shaft between the end bearings 36 is the patching roller 40, of the idling or non-driven type. This patching roller is preferably in the form of a metallic drum 41 closed at its ends by end heads 42 carrying collars 43 mounted on the shaft 38. The end bearings 36 may be of anti-friction type having rollers or balls therein, if desired.

Bolted to the horizontally extending arms 34b of the two L-shaped levers 34 are upwardly extending plates 46 between which are welded, or otherwise secured, two angle bars 47 and 48 which extend along the top of the patch roller 40, with their lower edges spaced slightly from the periphery of the roller. These angle bars 47 and 48 form the front and rear sides of an open bottom trough 50 in which are retained an oil mat 52 lying in contact with the upper surface of the patch roller 40 to keep a film of lubricant on the roller. The ends of the trough 50 are defined by end angle bars 49 (FIGURE 3) which extend between the front and rear angle bars 47 and 48 at the ends of the roller 40. An oil feed tank can be located at any convenient spot, such as on the rear portion of the frame 22, for supplying oil to the mat 52.

Extending between the horizontal or rearwardly extending arms 34b of L-shaped levers 34, in front and in rear of the roller 40, are reinforcing angle bars 56 and 58. These angle bars 56 and 58 secure the two horizontally extending arms 34b together for conjoint movement, and constitute front and rear members of a relatively stiff sub-frame in which the patching roller 40 is journaled. In addition, the lower flanges of these angle bars 56 and 58 lie in close proximity to the periphery of the roller 40 to serve as scrapers for scraping from the periphery of the roller any excess accumulation of patching compound tending to adhere to the roller.

The hydraulic lifting and lowering mechanism comprises two hydraulic cylinder and piston rams 59, these rams being disposed substantially vertically under opposite side edges of the attachment frame 22. Each ram 59 comprises a cylinder 60 provided at its upper end with a horizontal pivot sleeve 62 which is mounted on the rear pivot bolt 32 of the attachment frame 22. Reciprocating in each cylinder is a piston 64 mounted on a piston rod 66 extending from the lower end of the cylinder. This piston rod is provided with a clevis 68 at its lower end which embraces the horizontally extending arm 34b of the lever 34 and is pivotally secured thereto by the transverse pivot bolt 70. Each cylinder 60 is double acting and is provided with upper and lower oil connections 72 and 74 for admitting oil to the upper and lower sides of the piston 64, these oil connections being connected through flexible conduits with control valve apparatus and with the hydraulic pump of the hydraulic system with which the truck 7 is provided for operating the hydraulically lifted dumping box 18. In FIGURE 1 I have schematically shown the pump and control valve apparatus at 76 and the body lifting cylinder at 78, these only being shown diagrammatically because such are old and well known, and any conventional system, known to those skilled in the art, may be employed. The cylinders 60 can be connected to the pump and control valve apparatus 76 in a well known manner.

During the normal travel of the truck between patching operations, the patch roller 40 is held in its normal raised traveling or transport position, shown in dotted lines in FIGURE 1, by the pressure of oil admitted through the lower connections 74 to the two hydraulic cylinders 60 for swinging and holding the two L-shaped levers 34 at the upper limits of their movement; or, alternatively, the roller may be suitably latched in this upper position. After the batch of black top or other paving material has been deposited on the roadway, or immediately preparatory to depositing it on the roadway, the patching roller 40 is swung down into operative position by admitting oil to the upper cylinder connections 72. By suitably manipulating the control valve apparatus 76, the hydraulic pressure can be proportioned to exert different degrees of downward pressure upon the roller 40, up to the point where the reaction pressure lifts the weight of the rear end of the truck. Hence, a substantial part of the weight of the truck can be brought to bear upon the roller 40 for the performance of its rolling operation, only leaving sufficient weight on the rear pneumatic tires 10b to provide adequate traction for moving the vehicle, while still maintaining sufficient tractive engagement between the rear pneumatic tires 10b and the road so as to effect the necessary rolling travel of the truck 7 to enable the patching roller 40 to be rolled either forwardly or rearwardly over the freshly deposited batch of black top in the performance of the rolling operation. It will thus be seen that by virtue of the cooperative relationship between the hydraulic rams 59, the leaf springs 10a, and the pneumatic tires 10b, different proportions of the truck weight can be selectively applied as desired, either to the roller 40 for producing greater rolling pressure, or to the rear tires 10b for producing greater traction pressure. For example, when operating on level surfaces, by far the greatest proportion of the truck weight may be brought to bear upon the roller 40, at which time the rear tires 10b will only be touching the road surface with enough pressure to insure backward and forward travel of the truck and roller. On the other hand, when operating along an uphill surface, a greater proportion of the truck weight may be brought to bear upon the rear tires 10b so as to increase their tractive pressure for uphill travel. The relatively minute up and down adjustments which can be effected through the hydraulic rams 59 enable this operation of selectively applying different proportions of the truck weight to the patching roller or to the rear wheels to be readily performed. Also, by virtue of this selective distribution of the truck weight, the patching roller 40 has a resiliently cushioned rising and falling movement for readily following irregularities in the surface of the road or in the surface of the new black top. The above described selective distribution and the cushioning action can have substantial amplitude of vertical movement because of the large deflection of the rear springs 10b and because in the relatively large pneumatic tires commonly used on dump trucks of the present day an inward and outward tread deflection of two or three inches or even more is commonplace or can be easily accommodated. The large amplitude of relative downward adjustment which can be given to the patching roller 40, in a relative direction away from the truck frame 8, while still maintaining effective traction engagement between the rear tires 10b and the road, is an advantageous feature for adapting the downward rolling pressure of the roller 40 selectively either to light loads or to heavy loads within the dump body 18. The patching roller 40 is preferably of relatively small diameter, compared to the truck wheels 10, which has the two-fold advantage of creating a greater unit pressure per square inch over the relatively limited area of the small roller in engagement with the black top; and also of providing increased road clearance when the roller is elevated to its uppermost position within the limited space between the truck frame 8 and the road. Thus, a very substantial degree of downward pressure can be brought to bear upon the roller.

In FIGURES 5-13 I have shown a modified construction embodying a transversely rockable mounting of the patching roller, together with other improved features which will now be described. This modified embodiment of patch roller attachment is also shown as being mounted on the rear end of a dump truck corresponding to the dump truck shown in FIGURES 1-4, and the same reference numerals will be applied to corresponding parts of this modified embodiment, with the suffixes a, b, etc. appended thereto. The dump truck 7a comprises a conventional main frame 8a supported on the front and rear wheels 9 and 10 through interposed front and rear leaf springs 9a and 10a, these front and rear wheels having conventional pneumatic tires 9b and 10b respectively, the same as the dump truck embodiment of FIGURES 1-4. The rear drive wheels 10b are driven from the conventional rear axle 11a enclosed within a rear axle housing 12a and receiving power through the usual propeller shaft driven from the power plant at the front end of the truck, the same as previously described. A hydraulically operated dump body 18a is arranged to dump rearwardly over the rear end of the main frame 8a through an engine driven hydraulic pressure system, or through an electrically driven hydraulic pump, controllable either from the drivers cab or from the rear end of the truck.

The patching roller attachment 20a has self-contained or unitary mounting on the rectangular frame 22a extending transversely of the rear end of the truck main frame 8a. This frame 22a has substantially the same construction as the previous mounting frame 22, comprising front and rear transversely extending angle bars 24c and 25c and end angle bars 26c all welded together at the corners of the frame. Horizontal pivot bolts 31a and 32a pass through the vertical flanges of the end or side bars 26c for pivotally supporting the upper ends of the roller supporting levers and the upper ends of the ram cylinders.

The pivotally swinging frame for raising and lowering the patching roller 40a comprises L-shaped side arms having their upper ends pivotally mounted on the front set of pivot bolts 31a. These L-shaped side arms are shown as being made up of downwardly extending arms or links 34a, to the lower ends of which are rigidly welded rearwardly extending side plates 34b. These rearwardly extending side plates 34b constitute the sides or ends of an open rectangular lifting and lowering outer frame 82 for the patching roller, this latter frame being completed by spaced front and rear plates or bars 82' and 82" which have their ends welded to the side plates 34b.

Rockably mounted within the confines of this lifting and lowering outer frame 82 is a rectangular transversely rockable inner frame 86 in which the patching roller 40a is rotatively journaled for rolling motion along the batch of black top or other road surfacing material. This inner rocker frame 86 permits transverse rocking movement of the patching roller 40a in such rolling operation, as will now be described. The inner rocker frame 86 comprises transversely extending front and rear plates or bars 87', 87" which extend parallel to but are spaced inwardly from the front and rear lifting outer frame plates 82', 82" (FIGURES 7 and 12). Welded to the ends of these transversely extending front and rear rocker frame plates 87', 87" are rocker frame end plates 89', 89" which extend parallel to but are spaced inwardly from the side arms or side plates 34b of the lifting frame 82 (FIGURE 7). Bolted or otherwise secured to the inner sides of these rocker frame end plates 89', 89" are horizontal bearings 92', 92" in which the patching roller 40a is journaled for rolling rotation. The roller may have stub shafts 93', 93" projecting from its opposite ends for rotative mounting in the bearings 92', 92"; or, if desired, a transverse shaft 38a, comparable to the previously described shaft 38, may extend entirely through the roller with projecting ends rotatably supported in the bearings 92', 92", or with the roller rotatably mounted on said shaft.

The rocker frame 86, together with the patching roller 40a which is rotatably mounted therein, has transverse rocking movement within the lifting frame 82 about a horizontal fore and aft axis 95 which extends longitudinally of the vehicle 7a at a point preferably located substantially midway between the ends of the patching roller 40a. Also, this fore and aft rocker axis 95 is preferably located at a height which will either pass through or pass near the rotative axis of the roller. As best shown in FIGURE 11, this rocking axis 95 is defined between two aligned pivot pins 95' and 95", with the front pin 95' passing through aligned pivot holes in the two front frame plates 82' and 87' disposed forwardly of the roller 40a, and with the rear pin 95" passing through aligned pivot holes in the two rear frame plates 82" and 87" disposed in rear of the roller. Alternatively, each of these pivot pins 95', 95" may consist of studs welded to the rocker frame members 87', 87" and passing out through aligned pivot holes in the lifting frame members 82', 82". Each of the front and rear pivot pins 95' and 95" is shown as having its inner and outer ends mounted in a reenforcing arrangement of downwardly facing U-shaped clevises 97', 97" which substantially embrace the transversely extending front and rear lifting frame plates 82' and 82". These pivoting clevises comprise triangularly shaped plates 98', 98" which are preferably formed with lower flat edges that are welded to the horizontal top edges of the front and rear rocker frame plates 87', 87". Welded to the upper outer faces of these triangularly shaped plates are cylindrical spacers 99', 99", and welded to the outer sides of these spacers are straps or bars 101', 101" which extend downwardly on the outer sides of the front and rear lifting frame bars 82', 82". The lower ends of these straps or bars have apertures therein for mounting the outer ends of the pivot pins 95', 95", these straps or bars 101', 101" thereby constituting the outer legs of the downwardly facing clevises 97', 97". Thus, with the outer and inner ends of each pivot pin 95', 95" supported by the outer and inner legs of the clevises embracing the front and rear lifting frame bars 82', 82", it is possible to bring the entire weight of the rear end of the vehicle 7a, or any desired proportion thereof, to bear downwardly upon the patching roller 40a without the possibility of vertical cocking of either of the front and rear pivot pins 95', 95". By virtue of the fore and aft rocker axis 95, the patching roller 40a can rock or tilt transversely relatively to the vehicle 7a and to the lifting and lowering frame 82, whereby the patching roller 40a can readily accommodate itself to the sloping side of a crowned road or to a side-long slope around a curve. Still further, the rocking or tilting capability of the patching roller 40a enables the operator to carry the patching roller out to the very edge of the road shoulder, with the adjacent side wheels of the dump truck or of the motor grader traveling down in the ditch beyond the road shoulder. The end plates 89', 89" of the rocker frame are spaced inwardly a substantial distance from the side plates 34b, 34b of the lifting frame to permit the patching roller to rock through the sharp angle necessary to meet these requirements, as indicated approximately by the dotted line position of the roller shown in FIGURE 9.

Referring to FIGURE 11, it will be seen that the patching roller is provided with spring pressed front and rear scraper blades 104', 104" which are carried by the rocker frame 86 to bear against the front and rear surfaces of the patching roller adjacent to the bottom thereof, these scraper blades acting to scrape black top or other adhering material from the surface of the roller when the latter is rolling in either a forward or rearward direction. The scraper blades 104', 104" are mounted on inclined flanges 105', 105" which project inwardly from the lower edges of the front and rear rocker frame bars 87', 87", so that the scraper blades follow directly with the transverse rocking movement of the patching roller about the longitudinal rocking axis 95. The scraper blades 104', 104" and the mounting flanges 105', 105" extend substantially throughout the length of the patching roller, as shown in FIGURES 6 and 9, and at spaced points along their lengths the scraper blades have resilient attachment to the mounting flanges by bolts 106', 106". The inner ends of these bolts have anchored mounting in the mounting flanges 105', 105", and the outer threaded ends of the bolts pass loosely through holes in the upper portions of the scraper blades 104', 104". Engaging over these outer threaded ends are compression springs 107', 107", together with nuts 108', 108" which enable the pressure of the springs to be adjusted, whereby the sloping lower edges of the scraper blades can be brought to bear against the surface of the patching roller with greater or lesser pressure.

Extending lengthwise of the patching roller above the upper surface thereof is an open bottom trough 50a in which is confined a lubricating mat 52a lying in contact with the upper surface of the patching roller 40a to keep a film of lubricant on the roller, this lubricant generally consisting of water. The trough 50a may be constructed in different ways, the embodiment shown in FIGURE 12 comprising front and rear angle bars 47a and 48a which have their ends secured to vertical plates 46', 46" which extend upwardly and have their lower edges welded or otherwise secured to the end plates 89' and 89" of the transversely rockable frame 86. Thus, the trough 50a and the oil mat 52a rock directly with the patching roller in all rocking movement around the longitudinal axis 95.

Extending lengthwise above the lubricating mat 50a is a perforated spray pipe 112 having spaced spray apertures along its under surface for spraying water or other appropriate liquid down upon the mat 52a. The ends of this spray pipe 112 are mounted in lugs or ears 114 extending upwardly from the vertical end plates 46', 46" so that the spray pipe tilts with the rocker frame in the transverse rocking movement of the patching roller. Extending from the spray pipe is a flexible hose 116 which communicates through two valves 117 and 118 with the bottom of a supply tank 120 fixedly secured between the longitudinally extending side bars of the attachment frame 22a. The valve 117 is any suitable type of metering valve having a manually adjustable handle 121 for regulating the rate of flow from the tank 120 to the spray or drip pipe 112. The other valve 118 is an automatically actuated shut-off valve which shuts off liquid flow therethrough when the patching roller is raised to its nonoperative transport position, such as shown in dotted lines in FIGURE 10. Extending from the shut-off valve 118 is a reciprocable valve stem 123 which is adapted to be actuated by one arm of a bell crank lever 125 which is pivoted at 126 to a bracket 127 extending either from the body of the valve 118 or from the tank 120. A tension spring 129 connects the long arm of the bell crank lever 125 with the spray pipe 112 or other adjacent point of attachment responsive to the vertical swinging movement of the patching roller between its lower operative position and its upper transport position. When the roller is in its lower operative position the spring 129 is placed under sufficient tension to operate through the bell crank lever 125 for forcing the valve stem 123 inwardly to open the valve 118. When the roller is raised to its non-operating transport position the tension on the spring 129 is relaxed to the point that the valve 118 shuts itself off either under the action of an internal spring tending to shift the valve stem 123 outwardly or under the action of the pressure of the liquid tending to move the valve to closed position. This automatic shut-off valve 118 relieves the operator of the duty of remembering to turn off the water flow to the lubricating mat 52a after the roller has completed a patch rolling operation and has been raised to transport position. A filler tube 130 extends outwardly from the tank 120 to a convenient filling location, this tube being normally closed by a cap or plug 131.

It is also desirable to relieve the ram cylinders 60a of the duty of holding the patching roller in its raised position during long periods of transport, or during idle or overnight intervals when the equipment is at rest. To this end, I have provided link chains 132', 132" which have their lower ends connected to either the outer ends of the rocker frame 86 or to the outer ends of the lifting and lowering frame 82. The upper links of these chains are adapted to be dropped down into the open upper ends of vertical notches or slots 134', 134" formed in angle brackets projecting outwardly from the rear portion of the attachment frame. It will be obvious that when the hydraulic rams have been energized to raise the patching roller to transport position, the appropriate links of these chains are then dropped into the open top notches 134', 134" whereby the hydraulic pressure can then be released from the rams, and the chains will sustain the patching roller in transport position.

When the dump truck or other propelling vehicle, on which the patch roller attachment is mounted, is provided with a conventional hydraulic system as a standard or built-in part of its equipment, this hydraulic system can, in many instances, be utilized as the source of hydraulic pressure to be introduced into the ram cylinders 60, 60a for raising and lowering the patching roller. Such a conventional built-in system may be represented by the pump and valve control apparatus diagrammatically indicated at 76 in FIGURE 1, which hydraulic pump can be engine driven mechanically from the engine of the truck, or can be electrically driven from the electrical system of the truck, or can be manually actuated.

Alternatively, I contemplate as a modification the provision of a patch roller attachment assembly which is provided with its own hydraulic pump, hydraulic reservoir and control valve, etc. Such individual hydraulic pump, supplied as part of the equipment of the patch roller attachment assembly, can be operated either electrically from the electrical system of the propelling vehicle, or can be manually actuated. This arrangement of providing the patch roller system with its own individual hydraulic pump, reservoir and controls, etc. enables the system to be mounted on propelling vehicles which do not have a hydraulic system of their own. Moreover, by providing the patch roller system with its own hydraulic pump, it is generally possible to develop greater hydraulic pressures for bringing a greater proportion of the weight of the rear end of the propelling vehicle to bear downwardly on the patching roller in the rolling operation.

In the modified embodiments of the invention shown in FIGURES 5-20 I have shown the latter type of system employing an individual hydraulic pump which is separate and apart from any of the standard equipment of the propelling vehicle. This hydraulic pump, indicated as being contained within a housing 138, is driven by an electric motor 139, of the six volt or twelve volt type so as to be capable of receiving operating energy from the electrical system of a propelling vehicle. Embodied within the pump enclosing housing is an oil reservoir 141, and mounted on one end thereof is manually actuated control valve 142, all constituting part of a self-contained unit assembly 144. This unit assembly can be mounted at any desired point on the propelling vehicle, but is preferably mounted on the underside of the dump body 18 adjacent to the rear end thereof. Such location places the control valve handle 142 where it can be readily manipulated by a workman as he watches the performance of a patch rolling operation from a position located slightly to the side and rear of the propelling vehicle, enabling him to instantly increase or decrease the downward hydraulic pressure exerted on the patching roller to suit the requirements of the particular job. The flexibility of the hydraulic lines connecting with the pump 138 accommodate downward swinging movement of the pump in the rearward dumping movement of the dump body 18.

Extending from two outlet and return ports of the control valve 142 are flexible hydraulic conduits 146 and 148, the conduit 146 serving to supply hydraulic pressure to the upper ends of the ram cylinders 60a for forcing the patching roller downwardly, and the other conduit 148 serving to supply hydraulic pressure to the lower ends of the ram cylinders for raising the patching roller to transport position. Referring to FIGURES 11 and 13, these two hydraulic conduits 146 and 148 connect with two center ports 151 and 152 of a distributing block 153 carried by the attachment frame 22a. The upper center port 152 connects with an upper through passageway 155 which has its opposite ends connecting to flexible branch conduits 156, 156 extending to the lower ends of the two ram cylinders 60a. Thus, when control valve 142 is positioned to cause the pressure flow from the pump to pass through hydraulic lines 148 and 156 to the lower ends of the ram cylinders the patch roller will be raised to transport position.

Referring now to the lower center port 151, this connects with a through passageway 158 whch has its opposite ends connecting through flexible branch conduits 159, 159 extending to the upper ends of the ram cylinders 60a. Thus, when control valve 142 is positioned so as to cause the pressure flow from the pump to pass through hydraulic lines 146 and 159 to the upper ends of the ram cylinders the patch roller will be forced down into pressure contact against the road surface under a relatively heavy pressure, if desired. As previously described, this downward pressure may be made adequate to bring a large part of the weight of the rear end of the propelling vehicle to bear downwardly on the patching roller 40a, leaving only a sufficient proportion of the vehicle weight acting downwardly through the pneumatic tires 10b to establish the necessary traction engagement to enable the vehicle to propel the patching roller back and forth over the newly laid road surfacing material. It will be understood that when the control valve 142 is positioned to cause the pressure flow to occur through either one of the two lines 146 or 148 to the corresponding ends of the two ram cylinders, the return flow from the opposite ends of the two cylinders will be conducted back through the other of these two lines 146 and 148 and through thhe control valve 142 back to the oil reservoir 141. The control valve 142 also has a third or intermediate holding position in which it operates to hold any previously established pressures or quantities of hydraulic liquid in the upper and lower ends of the two ram cylinders, thereby holding or locking these ram cylinders in the operating positions desired. If desired, the hydraulic system may also be provided with a safety pressure relief valve, represented, for example, by a spring loaded ball relief valve usually associated directly with the hydraulic pump 138, such a relief valve being diagrammatically indicated at 162. This relief valve is connected to the discharge side of the hydraulic pump so as to always be responsive to the hydraulic pressure transmitted from the pump, this relief valve serving to prevent an excessive pressure acting downwardly on the patching roller from lifting the entire rear end of the propelling vehicle, including the rear pneumatic tires, off of the road surface, and also of preventing damage to the apparatus by excessive hydraulic pressures after the patching roller reaches its maximum raised position, as determined by the engagement of any appropriate motion limiting end stops.

This safety relief valve 162 may also be of such capacity and be so connected and set as to cushion shock loads exerted on the patching roller 40a in the event of the patching roller striking or encountering a sudden rise, bump or obstruction in the performance of its operation of rolling out a fill of road surfacing material. The above-described construction of electrically energized hydraulic power unit 144 is typically represented by the "Lectrolift" hydraulic power unit, manufactured by Wisconsin Hydraulics, Inc., of Milwaukee, Wisconsin. When it is desired that the hydraulically generated downward force exerted on the patching roller 40a shall have a relatively high degree of cushioning action for absorbing shock stresses and loads, etc., I provide the attachment assembly with a pneumatic form of cushioning device of the type commonly referred to as a "hydraulic accumulator." This comprises a relatively long cylinder 165 which preferably constitutes part of the patch roller attachment assembly, such as by being mounted in a transversely extending horizontal position on the inner or rear side of the front frame bar 24c of attachment frame 22, as illustrated in FIGURES 10 and 11. This accumulator cylinder is preferably detachably secured to the frame bar 24c by releasable clamping bands or clips 166. The ends of the accumulator cylinder are closed by end heads 167 and 168 which hermetically seal off the ends of the cylinder against extremely high pressure. Mounted in the cylinder for sliding movement between the end heads is a reciprocable piston 170. This piston has a relatively long skirt portion having piston rings 171, 171 encircling the ends of the skirt portion, together, with a V-O ring 173 encircling the central portion of the piston, these three rings being mounted in appropriate annular grooves in the piston. It will be understood that the piston has free sliding movement in opposite directions in the accumulator cylinder in response to differences of pressure on opposite sides thereof.

Opening into the end head 167 through threaded inlet 175 is a conduit 176 which extends to the connector block 153. Here, this conduit 176 communicates through upwardly extending central opening 177 which opens into the lower through passageway 158 that communicates with the upper ends of the hydraulic rams through the flexible branch conduits 159, 159. It will thus be seen that the right hand end of the accumulator cylinder 165 (FIGURE 13) is permanently connected to the upper ends of the hydraulic rams 60a, 60a so that when hydraulic pressures, particularly those in the higher ranges have been set up in the upper ends of these two hydraulic rams for forcing the patching roller 40a downwardly into high pressure engagement with the road surface, these same high hydraulic pressures will be constantly maintained against the right hand face of the piston 170 so that the piston is continuously responsive to the hydraulic pressures prevailing in the upper ends of the ram cylinders.

Pneumatic cushioning pressure is constantly exerted against the opposite or left hand end face of the piston 170 (FIGURE 14) through the expansion action of a charge of suitable gas, such as oil-pumped nitrogen, which is contained within the left hand end of the cylinder 165 under a predetermined or precharged pressure. This cushioning charge of gas is introduced into the left hand end of the cylinder through a one-way inlet gas valve 179 which is screwed into the opposite end head 168 of the accumulator cylinder, this valve being suitably protected against injury or shock by a U-shaped valve protector 182 which is secured to the end head 168 over the outer end of the valve. The degree of cushioning pressure of the precharging gas is dependent upon the weight of the propelling vehicle, the road surfacing material to be laid, the sharpness and amplitude of the bumps or rises and falls in the original road surface, and other factors. For example, if the propelling vehicle is relatively heavy, and it is desired to impose a goodly proportion of the weight of the rear end of such vehicle upon the patching roller, a relatively high precharging pressure of the nitrogen gas may be introduced into the left hand end of the cylinder. Conversely, if the propelling vehicle is lighter, or if the road surface to be patched or refinished is relatively bumpy, possibly with sharp dips and rises at street intersections, it may be desirable to have a greater degree of cushioning action, which can be obtained by introducing a lower precharging pressure of the gas into the left hand end of the accumulator cylinder. After the cylinder has been mounted in or on the propelling vehicle, as by the clamping bands or clips 166, 166, the charging valve 179 still remains readily accessible for introducing more gas into the accumulator cylinder from a high pressure source, or for venting some of the gas from the cylinder. As illustrative of pressures which may be employed, in an accumulator cylinder of average size, say about 4 inches inside diameter, precharging gas pressures ranging from 100 pounds to about 2700 pounds per square inch can be employed for obtaining hydraulic operating pressures, to which the hydraulic liquid in the ram cylinders is responsive, ranging from about 200 to about 3,000 pounds per square inch, thus enabling a wide latitude of pneumatic cushioning action to be obtainable in the upper ends of the ram cylinders. It will be understood that this pneumatic cushioning action resulting from the use of the compressible gas in the precharged end of the accumlator cylinder will result in a much more rapidly acting cushioning effect than is possible either when using merely a pressure responsive relief valve acted on directly by the incompressible hydraulic liquid, or when using spring urged pistons arranged to yield directly in response to the pressure changes in the incompressible hydraulic liquid.

Different constructions of dump trucks, or of other propelling vehicles, may have their main frames 8 or 8a disposed at substantially different heights above the ground because of different rear wheel diameters, different spring suspensions, etc., and this may make it difficult to mount the patch roller attachment 20 or 20a upon these vehicles of varying heights, while still having the patch roller 40 or 40a movable downwardly into an effective rolling position or upwardly into a proper transport position. In FIGURE 14 I have shown a vertically adjustable type of pivot mounting which can be employed for pivotally mounting the upper ends of the L-shaped levers 34 or 34a and the upper ends of the hydraulic ram cylinders 60 or 60a for accommodating the two embodiments shown in FIGURES 2 and 5 to these trucks or other propelling vehicles of different heights. In this modified or optional construction, the upper end of each side arm 34a extends upwardly into a clevis-like space between two parallel pivot bars or brackets 185 which have their upper ends welded or otherwise secured to the attachment frame 22a and which extend downwardly in closely spaced parallel relation therefrom. Extending transversely through these two pivot bars, at the lower ends thereof, are aligned pivot apertures 186, through which passes the removable pivot pin 31b. The upper end of the associated lever arm 34a is provided with two or more vertically spaced pivot apertures 187, 188, etc. passing therethrough for receiving the removable pivot pin 31b. When the parts are adjusted to have the pivot pin 31b pass through the lower hole 187 the roller mounting occupies an upwardly adjusted position for accommodating a low height of truck or other propelling vehicle; and when the pivot pin is arranged to pass through the upper pivot hole 188 the roller mounting is then adjusted to accommodate a propelling vehicle of greater frame height.

In the case of the two hydraulic rams 60 or 60a, the overall stroke of the piston in each cylinder may be adequate to accommodate the higher or lower setting of the patch roller mounting; or, if desired, the upper end of each of these ram cylinders may have an adjustable pivot pin mounting similar to that described for each lever arm 34a. That is to say, a pair of pivot bars or brackets 191 may have their upper ends welded or otherwise secured to the attachment frame 22a, with their lower ends extending downwardly therefrom in closely spaced parallel relation for receiving therebetween a pivot tongue 60b extending from the upper end of the hydraulic cylinder 60a. Aligned pivot holes 192 in the lower ends of the pivot bars 191 receive the removable pivot pin 32b. The pivot tongue 60b is provided with two or more vertically spaced pivot holes 193, 194, etc. passing therethrough for receiving the pivot pin 32b. Placing the pivot pin 32b in a selected one of the holes 193, 194, etc. serves to vertically adjust the hydraulic ram 60a to accommodate different heights of propelling vehicles, in the same manner as described above in connection with the pivot pin 31b. Such vertical adjustments of the patch roller and its mounting frame and rocker frame can be readily effected without disturbing the hydraulic connections or liquid supply connections, owing to the flexibility of the hydraulic conduits 156, 159, and also of the liquid supply hose 116 and valve operating spring 129.

In FIGURES 15 to 19 inclusive, I have illustrated a further embodiment of the invention adapted for mounting on the rear end of a motor driven road grader or scraper, such motor grader being designated 200 in its entirety. These motor graders generally embody a relatively long main frame 201 having a low rearwardly extending portion 202 and having an upwardly arched front portion 203. The rearwardly extending portion 202 generally has unsprung mounting on tandem pairs of rear driving wheels 204, and the upwardly arched front portion 203 likewise has unsprung mounting on a pair of steerable front wheels 205. Suspended beneath the upwardly arched front portion 203 of the frame is the conventional scraper blade or mold board 207 which is provided with the conventional variety of adjustments enabling the scraper blade to be raised and lowered, turned to different angles, shifted endwise, tilted fore and aft, etc. The rear driving wheels 204 and the front steering wheels 205 of these motor graders are almost invariably provided with pneumatic tires, but the grader frame 201 generally has the aforesaid unsprung mounting directly on the axles of these front and rear wheels, i.e. such mounting being without the interposition of any leaf springs or other springs between the grader frame and the wheels. Such unsprung mounting is desirable in these motor graders so as to insure that the lower edge of the scraper blade 207 will travel uniformly at a predetermined scraping level, with a minimum tendency to rise or fall when encountering different road conditions in a road grading operation. The operator's position on the grader is indicated at 209, and the power plant 210 is in rear thereof, with the cooling radiator for such power plant facing rearwardly. The power plant 210 transmits a drive to each pair of tandem side wheels 204 through rocker housings 212 which have horizontal axis pivotal mountings 213 at central points between the tandem drive wheels 204, so that these rocker housings can tilt in vertical planes around the pivot axes 213. The tandem wheels have driving axles mounted in the front and read ends of the rocker housings, and driving chains or trains of gears within the rocker housings transmit the propelling drive to these vertically rockable driving axles and tandem wheels, as is well known to those skilled in the art.

The modified form of patch roller apparatus for mounting on the rear end of such motor grader comprises a bracket frame designated 215 in its entirety, which is made up of rearwardly extending brackets 216 and forwardly extending brackets 217, these brackets having their abutting edges provided with transversely extending mounting or facing flanges 218 and 219 respectively, which are secured together by bolts 221. The lower end of the bolting flange 218 of rear bracket 216 has a bolting pad 223 extending outwardly and inwardly therefrom for receiving a plurality of bolts 224 having attachment to the motor grader frame. The front end of each front bracket 217 has inwardly and outwardly extending horizontal bolting flanges or pads 226, and extending downwardly through these flanges 226 are inner and outer pairs of vertical tie bolts 228. The lower ends of these tie bolts pass through the outer and inner ends of clamping plates 230, there being one of these clamping plates at each side of the grader, and each clamping plate being drawn upwardly into rigid clamping engagement against the underside of a longitudinal grader frame member 202. The patching roller 40b and its associated accessories or components are all mounted on this attachment frame 215, which enables the entire patching roller assembly to be readily mounted upon and dismounted from the motor grader frame.

The patching roller is supported between pivotally swinging side arms 34' comprising the upwardly inclined front arms 34a' and the horizontally extending rear arms 34b'. The upwardly inclined front arms have pivotal mounting at the lower end of each rear frame bracket 216 on horizontal pivot pins 31a. The hydraulic ram cylinders 60b have their upper ends mounted on pivot pins 32b carried by the rear ends of the rear frame brackets 216, and the lower end of each hydraulic piston rod 66b is pivotally connected with the lifting and lowering side arm 34' by pivot pin 70b.

The patching roller 40b has the same transversely rockable mounting as previously described, this comprising the rocker frame 86b mounted for transverse rocking movement within a rectangular lifting and lowering frame 82b, comparable to the previously described frames 86 and 82, such rocking movement occurring about the fore and aft rocker axis 95b (FIGURE 17). The rocker frame 86b carries the spring pressed scraper blades 104b, having the same construction and mounting as the previously described scraper blades 104', 104''.

The lubricating trough 50b carrying the lubricating mat 52b extends substantially the length of the patching roller and may have the same mounting on the rocker frame 86b through end plates similar to the previously described end plates 46'. However, as illustrative of another method of mounting this lubricating trough and mat, I have shown the same supported in FIGURES 16, 17 and 19 by angularly shaped straps which have their lower ends secured to the frame 86b. The same previously described arrangement of spray pipe 112b connection through flexible hose 116b which communicates through manually operated flow control valve 117b and through automatic shut-off valve 118b with the bottom of a lubricant supply tank 120b mounted between the rearwardly extending frame brackets 216. The automatic shut-off valve 118b responds through bell crank lever 125b and operating spring 129b to the lifting and lowering of the patching roller in the same manner previously described. The hold-up chains 132b extend upwardly from each side of the lifting and lowering frame and are adapted to have their appropriate links dropped into vertical slots 134b of hold-up brackets 135b when it is desired to hold the patching roller up in its elevated transport position.

Because the frame 201 of this motor grader has the aforesaid unsprung mounting on the pneumatic tired wheels 204 and 205, it is desirable to use the hydraulic accumulator with the hydraulic system supplying the hydraulic rams 60b in this embodiment. FIGURES 18 and 19 show such hydraulic accumulator, designated 165b as being mounted vertically on the inner side of one of the rear frame brackets 216, with the flexible hose connection 176b entering the top of the accumulator cylinder. The remainder of the hydraulic system, comprising the connector block 153b, the electrically driven hydraulic pump 138, and the control valve 142b are all constructed and arranged substantially the same as previously described. Alternatively, if the motor grader 200 is equipped with a self-contained hydraulic system affording sufficiently high hydraulic pressures, this source of hydraulic liquid supply may be employed instead of utilizing the electric pump 138b. Because of the unsprung mounting of the grader frame, the hydraulic accumulator 165b is a desirable adjunct to take care of the sharper rise and fall of the motor grader frame when encountering uneven surfaces in the road or street, as for example at the intersection of two streets. The provision of the hydraulic accumulator can provide a pneumatically cushioned rise and fall of the patching roller through an amplitude of 2 to 6 inches or more, depending upon the size of the accumulator. Where a relatively large range of pneumatically cushioned accumulator is desired, this may be obtained by connecting two or more accumulator cylinders, with both connected in parallel to the central connector block port 177, or with an individual accumulator cylinder connected to the upper end of each of the hydraulic rams 60b.

In FIGURE 20 I have illustrated a further embodiment of the improved cushioning means which utilizes powerful compression springs 235 interposed between the upper end of each hydraulic ram 60b and the associated bracket frame 215 at each side of the vehicle. Each of these compression springs 235 is enclosed within a cylindrical shell or casing 236 which is secured to or formed integral with the extended upper end of the adjacent mounting frame bracket 216. The upper end of each compression spring 235 has abutment reaction against the upper end of each cylindrical shell 236, which upper end is closed except for an opening therethrough to accommodate the outward sliding movement of an axially extending guide rod 237. The lower portion of such guide rod carries a cylindrical thrusting disk or head 238 which has free sliding movement within the enclosing shell 236, the lower end of the compression spring 235 bearing against this thrusting disk or head 238. Below such thrusting disk 238 is formed a downwardly extending pivot eye or pivot clevis 239 which is adapted to establish pivotal connection through pivot pin 32d with the pivot eye or pivot clevis 60d projecting upwardly from the upper end of the ram cylinder. Screwing down over a thread on the upper end of the guide rod or stem 237 is a nut 241 which, in cooperation with a washer 242, forms an end stop for limiting the downward movement of the guide stem and compression spring within the confining shell 236.

From the foregoing it will be seen that in this embodiment of cushioning apparatus, the entire endwise thrust of each hydraulic ram 60b is transmitted upwardly to the rear portion of the propelling vehicle through the cushioning spring 235, which spring is made with a sufficiently heavy deflection pressure so that a large proportion of the weight of the rear end of the propelling vehicle can be brought to bear downwardly upon the patching roller 40.

Thus, the two compression springs 235 at opposite sides of the vehicle establish sufficient resilient cushioning action, whereby to avoid or minimize shock loads or stresses acting against the roller 40, notwithstanding the incompressibility of the hydraulic liquid in the hydraulic rams 60b.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a hydraulically operated patch roller attachment unit for mounting on a dump truck wherein the truck comprises a main frame, front steering wheels and rear driving wheels, a rear axle for driving said rear wheels, pneumatic tires on said wheels whereby said dump truck is capable of relatively high speed travel in its hauling of road surfacing material from the point of supply to the point of use, said truck also comprising a hydraulically operated dump body for dumping over the rear end of the truck main frame beyond said rear drive wheels, said patch roller attachment unit comprising the combination of a substantially horizontal attachment frame attached to the underside of the truck main frame at a point below the rear end of the truck dump body and in rear of said rear axle, a pair of L-shaped levers having substantially vertical arms and having substantially horizontal arms extending rearwardly therefrom, the upper ends of said substantially vertical arms being pivotally connected to the front portion of said attachment frame adjacent to each side edge thereof, a transversely extending non-driven patching roller rotatably journaled between the rear ends of said substantially horizontal lever arms, a pair of hydraulic cylinder and piston rams having their upper ends pivoted to the rear part of said attachment frame adjacent to the sides thereof and having their lower ends pivotally connected with the substantially horizontal arms of said levers at each side of the attachment unit and being operative to force said patching roller from an elevated position down into a lowered position in patch rolling engagement with the road surface independently of dumping movement of said dump body, and control valve apparatus for supplying hydraulic pressure to said hydraulic rams, which hydraulic pressure can be proportioned to exert different degrees of downward pressure upon the roller, up to the point where the reaction pressure lifts the weight of the rear end of the truck, whereby a substantial part of the weight of the truck can be brought to bear upon the roller for the performance of its rolling operation, only leaving sufficient weight on the rear pneumatic tires to provide adequate traction for moving the vehicle, said attachment unit parts comprising said hydraulic rams, levers and patching roller all remaining below the top of said horizontal attachment frame in either the elevated or lowered positions of the patching roller, and in which elevated position all of said attachment unit parts occupy raised positions spaced substantially above the road surface but below the horizontal plane of said attachment frame whereby said attachment unit parts do not interfere with the high speed travel of the truck, or with the dumping motion of said dump body nor the dumping of the road patching material therefrom.

2. In a hydraulically operated patch roller attachment unit for mounting on a dump truck wherein the truck comprises a main frame, front steering wheels and rear driving wheels, a rear axle for driving said rear wheels, pneumatic tires on said wheels whereby said dump truck is capable of relatively high speed travel in its hauling of road surfacing material from the point of supply to the point of use, said truck also comprising a hydraulically operated dump body for dumping over the rear end of the truck main frame beyond said rear drive wheels, said patch roller attachment unit comprising the combination of a substantially horizontal attachment frame attached to the underside of the truck main frame at a point below the rear end of the truck dump body and in rear of said rear axle, a pair of L-shaped levers having substantially vertical arms and having substantially horizontal arms extending rearwardly therefrom, the upper ends of said substantially vertical arms being pivotally connected to the front portion of said attachment frame adjacent to each side edge thereof, a pair of spaced front and rear transversely extending lifting and lowering frame members extending between the substantially horizontal arms of said L-shaped levers, pivots carried by said front and rear lifting and lowering frame members defining a rocker axis extending substantially longitudinally of the propelling vehicle, a rocker frame pivotally mounted on said pivots to have freedom for transverse rocking movement about said rocker axis, a transversely extending non-driven patching roller rotatably journaled in said rocker frame for lifting and lowering motion with said lifting and lowering frame members and for transverse rocking motion with said rocker frame, a pair of hydraulic cylinder and piston rams having their upper ends pivoted to the rear part of said attachment frame adjacent to the sides thereof and having their lower ends pivotally connected with the substantially horizontal arms of said levers at each side of the attachment unit and being operative to force said patching roller from an elevated position down into a lowered position in patch rolling engagement with the road surface independently of dumping movement of said dump body, and control valve apparatus for supplying hydraulic pressure to said hydraulic rams, which hydraulic pressure can be proportioned to exert different degrees of downward pressure upon the roller, up to the point where the reaction pressure lifts the weight of the rear end of the truck, whereby a substantial part of the weight of the truck can be brought to bear upon the roller for the performance of its rolling operation, only leaving sufficient weight on the rear pneumatic tires to provide adequate traction for moving the vehicle, said attachment unit parts comprising said hydraulic rams, levers and patching roller all remaining below the top of said horizontal attachment frame in either the elevated or lowered positions of the patching roller, and in which elevated position all of said attachment unit parts occupy raised positions spaced substantially above the road surface but below the horizontal plane of said attachment frame whereby said attachment unit parts do not interfere with the high speed travel of the truck, or with the dumping motion of said dump body nor the dumping of the road patching material therefrom.

3. In a hydraulically operated patch roller apparatus for mounting on a self-propelled vehicle, wherein the vehicle comprises a vehicle frame, front steering wheels, rear driving wheels, a transverse driving axle for driving said rear wheels, and pneumatic tires on said front and rear wheels, said patch roller apparatus comprising the combination of an attachment frame attached to the rear portion of said vehicle frame in rear of said rear axle, a pair of widely spaced angularly-shaped levers having substantially downwardly extending arms and having substantially rearwardly extending arms projecting rearwardly from the lower portions of said downwardly extending arms, the upper portions of said downwardly extending arms being pivotally connected to said attachment frame at widely spaced pivoting points defining a transverse horizontal pivot axis around which both of said levers have simultaneous vertical swinging movement, an outer lifting and lowering frame comprising for its side members the rearwardly extending arms of said levers and also comprising a pair of spaced front and rear transversely extending lifting and lowering frame members extending between the substantially rearwardly extending arms of said levers, pivots carried substantially centrally of said front and rear lifting and lowering frame members defining a tilting axis extending substantially longitudinally and centrally of the propelling vehicle, a substantially rectangular tilting inner frame pivotally mounted on said pivots within said lifting and lowering outer frame to have freedom for transverse tilting movement about said tilting axis of said outer frame, a transversely extending non-driven patching roller rotatably journaled in said tilting inner frame for lifting and lowering motion with said lifting and lowering outer frame and for transverse tilting motion with said tilting inner frame, a hydraulic system comprising a pair of hydraulic cylinder and piston rams having their upper ends pivoted to said attachment frame and having their lower ends pivotally connected with the rearwardly extending arms of said levers, whereby said rams are operative to lift said roller to a raised transport position out of contact with the road surface, or operative to force said roller down into a road rolling position in pressure engagement with the road surface, a source of hydraulic liquid carried by said propelling vehicle operative to be put under pressure, and control valve apparatus for controlling the flow of such hydraulic pressure to said rams, which hydraulic pressure can be proportioned to exert different degrees of downward pressure upon the roller up to the point where the reaction pressure lifts part of the weight of the rear end of the propelling vehicle, whereby a substantial part of the weight of the vehicle can be brought to bear upon the roller in the performance of its rolling operation, only leaving sufficient weight upon the pneumatic tires of said rear wheels to provide adequate traction for propelling the vehicle.

4. The combination of the subject matter of claim 1 together with pneumatic cushioning means cooperating with said hydraulic rams for pneumatically cushioning the patch roller apparatus against shock stresses arising from the roller striking obstructions or dropping into depressions in the road surface in the performance of its rolling operation.

5. The combination of the subject matter of claim 2 which is further provided with pneumatic cushioning means cooperating with said hydraulic rams for pneumatically cushioning the patch roller apparatus against shock stresses arising from the roller striking obstructions or dropping into depressions in the road surface in the performance of its rolling operation.

6. The combination of the subject matter of claim 2 which is further provided with front and rear spring-pressed scraping blades operative to bear against the front and rear surfaces of said roller for cleaning off said roller, said scraping blades being mounted on said rocker frame for transverse rocking motion with said roller and with said rocker frame in the road rolling operation.

7. The combination of the subject matter of claim 2 which is further provided with a source of lubricating liquid, distributing means for distributing said lubricating liquid along the surface of said patching roller, valve means controlling the flow of such lubricating liquid from said source to said distributing means, and means for automatically controlling said valve means in response to the vertical position of said roller, whereby said valve means automatically interrupts such flow when the patching roller is raised to an inoperative transport position and automatically reestablishes such flow when the patching roller is moved down into engagement with the road surface.

8. The combination of the subject matter of claim 2 which is further provided with a hydraulic accumulator connected with said hydraulic system for pneumatically cushioning the downward pressure exerted on said patching roller through said hydraulic rams, said hydraulic accumulator comprising a cylinder having a liquid-containing end containing the hydraulic liquid which is effective in the upper ends of said rams for forcing said patching roller down into pressure engagement against the road surfaces, said cylinder having an opposite gas-containing end containing a pre-charged quantity of gas, and a piston freely reciprocable in said cylinder between said liquid containing end and said gas containing end.

9. The combination of the subject matter of claim 3 in which the source of hydraulic pressure comprises, an electrically driven hydraulic pump mounted on the dump body for swinging therewith during the dumping operation, with flexible hydraulic lines connecting said hydraulic pump with said hydraulic ram means and accomodating by their flexibility the dumping motion of said dump body relatively to said hydraulic ram means, and wherein the control valve apparatus for controlling the flow of hydraulic pressure between said hydraulic pump and said hydraulic ram means is also mounted on said dump body to swing downwardly therewith during the dumping operation.

10. In road rolling apparatus of the class described for use on a self-propelled vehicle comprising a frame supported on front steering wheels and on rear driving wheels, and wherein each of said wheels is provided with pneumatic tires, the combination of mounting apparatus for mounting on said frame, a transversely extending non-driven roller extending crosswise of said frame in rear of said rear driving wheels, a pair of roller supporting arms extending lengthwise of said frame for swinging movement in vertical planes disposed outwardly beyond the ends of said roller, bearing means carried by said arms in which said roller is journaled for axial rotation when the roller is in contact with the road during road rolling travel of the vehicle, bearing means carried by said arms for pivotally mounting the forward portions of said arms on said vehicle, a pair of substantially vertically extending hydraulic rams, means pivotally connecting the upper ends of said rams with said vehicle, means pivotally connecting the lower ends of said rams with said arms, whereby the extension of said rams forces said roller down into rolling engagement with the road surface, and retraction of said rams raises said roller to a non-operating position substantially above the road surface for placing said vehicle in condition for transport travel, means carried by said vehicle for supplying hydraulic pressure to said rams, and control apparatus for controlling the supply of hydraulic pressure to said rams, which hydraulic pressure can be proportioned to exert different degrees of downward pressure upon the roller, up to the point where the reaction pressure lifts the weight of the rear end of said vehicle, whereby a substantial part of the weight of the vehicle can be brought to bear upon the roller for the performance of its rolling operation, only leaving sufficient weight on the rear pneumatic tires to provide adequate traction for moving the vehicle.

11. The combination of the subject matter of claim 10 which is further characterized by a rocker frame in which said roller is journaled for axial rotation, and mounting means for mounting said rocker frame on said pair of supporting arms comprising pivot means defining a rocker axis extending substantially longitudinally of said vehicle, whereby said roller is capable of transverse rocker movement about said rocker axis.

References Cited in the file of this patent

UNITED STATES PATENTS

| | | |
|---|---|---|
| 1,994,812 | Diecke | Mar. 19, 1935 |
| 2,127,485 | Owens et al. | Aug. 16, 1938 |
| 2,133,173 | Meyer | Oct. 11, 1938 |
| 2,159,347 | Austin | May 23, 1939 |
| 2,199,649 | Poulter | May 7, 1940 |
| 2,510,817 | Greiner et al. | June 6, 1950 |
| 2,559,427 | Hastings | July 3, 1951 |